US008636180B2

(12) United States Patent
Veltrop et al.

(10) Patent No.: US 8,636,180 B2
(45) Date of Patent: Jan. 28, 2014

(54) PINCH VALVE

(75) Inventors: Loren Veltrop, Chicago, IL (US); Christopher Lyons, LaGrange Park, IL (US)

(73) Assignee: Prince Castle, LLC, Carol Stream, IL (US)

( * ) Notice: Subject to any disclaimer, the term of this patent is extended or adjusted under 35 U.S.C. 154(b) by 172 days.

(21) Appl. No.: 13/169,432

(22) Filed: Jun. 27, 2011

(65) Prior Publication Data

US 2012/0325860 A1 Dec. 27, 2012

(51) Int. Cl.

| | |
|---|---|
| ***B67D 3/00*** | (2006.01) |
| ***B67D 7/06*** | (2010.01) |
| ***B65D 37/00*** | (2006.01) |
| ***F16K 7/04*** | (2006.01) |
| ***F16K 31/02*** | (2006.01) |
| ***F25D 3/00*** | (2006.01) |

(52) U.S. Cl.
USPC ............... 222/504; 222/512; 222/212; 251/7; 251/129.03; 62/396

(58) Field of Classification Search
USPC ............ 222/504, 511, 212, 214; 251/7, 9, 10, 251/129.03
See application file for complete search history.

(56) References Cited

U.S. PATENT DOCUMENTS 3,012,701 A * 12/1961 Weber ........................... 222/449
3,264,067 A * 8/1966 Alderfer ........................ 422/110
3,941,349 A * 3/1976 Pierson ......................... 251/100
4,228,926 A * 10/1980 Gordon ......................... 222/103
4,450,862 A * 5/1984 Hogan .......................... 137/595
4,537,332 A * 8/1985 Brown et al. ................. 222/190
4,634,092 A * 1/1987 Daniell et al. .................... 251/7
4,804,118 A * 2/1989 Mullen et al. ................. 222/641
5,188,334 A * 2/1993 Yoshii et al. ...................... 251/7

(Continued)

FOREIGN PATENT DOCUMENTS

WO WO 9425354 11/1994
WO WO 2004037595 5/2004

(Continued)

OTHER PUBLICATIONS

Silver King®, Majestic Series Milk Dispensers specification sheet FNSKMAJ09, 2009.

(Continued)

*Primary Examiner* — Paul R. Durand
*Assistant Examiner* — Matthew Lembo
(74) *Attorney, Agent, or Firm* — Kelly & Krause, LP; Joseph P. Krause

(57) ABSTRACT

A pinch valve for use with a liquid dispensing cabinet is comprised of a tube pinching device configured to translate between an open position and a closed position and an electrically powered linear actuator configured to provide a valve opening force to the tube pinching device, The pinching device is coupled to a spring device configured to apply a valve closing force to the tube pinching device. The pinch valve is additionally comprised of an operator handle facilitating manual opening of the tube pinching device. The pinching device is rotatable in the valve body. The valve body has a front surface heat sink against which a tube pinching force is applied by a tube pinching device and a rear surface with a concavity configured to receive a tube carrying a heat transferring fluid. The tube pinching device can be operated electrically or manually.

17 Claims, 9 Drawing Sheets

(56) References Cited

U.S. PATENT DOCUMENTS

| | | | | |
|---|---|---|---|---|
| 5,249,706 | A * | 10/1993 | Szabo | 222/20 |
| 5,340,211 | A | 8/1994 | Pratt | |
| 5,797,519 | A | 8/1998 | Schroeder et al. | |
| 5,921,440 | A | 7/1999 | Maines | |
| 5,938,078 | A * | 8/1999 | Dorsey et al. | 222/105 |
| 6,186,361 | B1 | 2/2001 | Teetsel, III | |
| 6,253,957 | B1 | 7/2001 | Messerly et al. | |
| 6,497,343 | B1 * | 12/2002 | Teetsel, III | 222/1 |
| 6,516,625 | B2 * | 2/2003 | Bedard | 62/389 |
| 6,659,311 | B2 | 12/2003 | Prueter | |
| 6,695,278 | B2 * | 2/2004 | Ellis | 251/5 |
| 6,761,285 | B2 * | 7/2004 | Bertone | 222/94 |
| 6,792,966 | B2 | 9/2004 | Harvey | |
| 6,871,660 | B2 * | 3/2005 | Hampsch | 137/1 |
| 7,337,920 | B2 | 3/2008 | Duck et al. | |
| 8,376,310 | B2 * | 2/2013 | Veltrop et al. | 251/7 |
| 2007/0192981 | A1 | 8/2007 | Lawshe | |
| 2007/0267446 | A1 | 11/2007 | Pressler | |
| 2009/0250491 | A1 | 10/2009 | Erman et al. | |
| 2010/0065587 | A1 | 3/2010 | Erman et al. | |

FOREIGN PATENT DOCUMENTS

| | | |
|---|---|---|
| WO | WO 2005030276 | 4/2005 |
| WO | WO 2008153535 | 12/2008 |
| WO | WO 2010/038047 | 4/2010 |

OTHER PUBLICATIONS

Silver King® Cream Dispenser, Model SKMCD1P, equipment manual for McDonald's Corporation®, 2005.

SureShot® Dispensing Systems, Advance Portion Controlled Refrigerated Liquid Dispensers specification sheet, A.C. Dispensing Equipment, Lower Sackville, Nova Scotia Canada, Jan. 2011.

SureShot® Dispensing Systems, Suggested Preventive Maintenance Checklist for Refrigerated Liquid Dispenser, A.C. Dispensing Equipment, Lower Sackville, Nova Scotia Canada, Sep. 2006.

SureShot® Intellishot Dispensing System Specification; A.C. Dispensing Equipment Inc., Sep. 2007.

Fluid Mechanics, Fundamentals and Applications; Yunus A. Cengal and John M. Cibal; chapter 12: Radiation Process and Properties, McGraw Hill, Higher Education, copyright 2006.

SureShot® Flexoshot, A.C. Dispensing Equipment Inc., Lower Sackville, Nova Scotia Canada, Sep. 2007.

* cited by examiner

PINCH VALVE

BACKGROUND

A pinch valve is a valve operable with a flexible tubing or hose, and which is capable of pinching the tube or hose using a tube-pinching mechanism. Pinch valves are typically full bore, linear action valves that can be used in an off/on manner. Some pinch valves, however, can be used in a variable position or throttling service.

Pinch valves are used in many medical and pharmaceutical applications. They are also used in food dispensing applications because a main advantage of pinch valves is that they facilitate cleanliness, excellent drainage, and ease of cleaning. In addition to cleanliness, another advantage of pinch valves is their operation speed. Most pinch valves are simply on-off valves; they open and close a flexible tube using a pinch bar that moves between two positions. Moving a pinch bar through two, fixed locations can be done quickly, especially if the pinch bar is moved by an electrically-actuated solenoid.

Electromechanical closure of a pinch valve is typically accomplished by activating a solenoid to draw a spring-biased bar or gate against an elastomeric sleeve or tube, thereby cutting off fluid flow through the tube or sleeve. Some prior art pinch valves are fluid actuated wherein the pinching action is accomplished by air or hydraulic pressure placed on the elastomeric sleeve or tube.

A problem with prior art pinch valves, especially those used with dairy products, is that they do not facilitate the installation and removal of a bulk container. Stated another way, prior art pinch valves typically require disassembly to install and/or remove a tube passing through them and also for cleaning.

DETAILED DESCRIPTION

Figure 1:
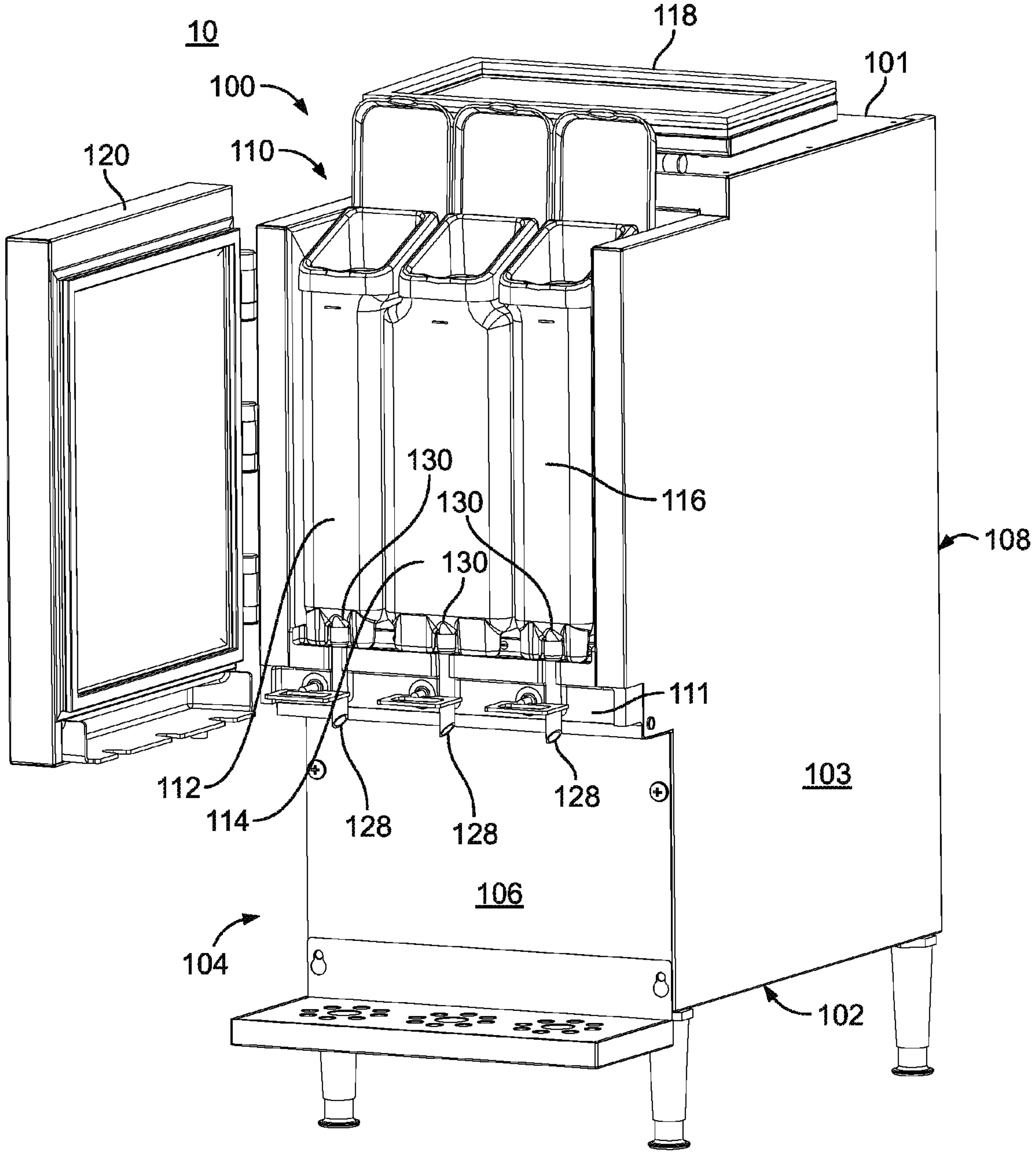
FIG. 1 is a perspective view of a refrigerated dispenser for liquids.

FIG. 1 is a refrigerated liquid dispenser 10. The dispenser 10 is comprised of a cabinet 100 having a top 101, a bottom 102, a right side 103, a left side 104, a front side 106 and an opposing rear side 108, not visible in FIG. 1. A refrigerated interior 110 is sized, shaped and arranged to enclose and refrigerate three liquid containers 112, 114 and 116. Access to the refrigerated interior 110 is provided by a hinged top door 118 and a hinged front door 120. The top door 118 and the front door 120 enable the liquid containers 112, 114 and 116 to be replaced and/or refilled. In one embodiment of the dispenser 100, the containers 112, 114 and 116 are the containers disclosed and claimed in the applicant's co-pending patent application serial number 13/169,339 entitled "Liquid Dispenser with Storage Tanks," filed on Jun. 27, 2011, and which is incorporated by reference herein in its entirety.

In one embodiment, the liquid containers 112, 114 and 116 are formed of a rigid plastic. Each one has a top opening as described in the aforementioned co-pending patent application and is thus refillable. Each container has two opposing side walls, a front side and an opposing rear side, a top having a refill opening and a bottom. Barely visible in FIG. 1 are short drain cylinders 130 that extend downwardly from the container bottoms. The drain cylinders are connected to a flexible tube 128 that extends downward in front of a horizontal lower panel 111 that extends across the front 106 of the cabinet 100. The tube 128 also extends through a pinch bar of pinch valve. Liquid in the containers 112, 114 and 116 will thus flow by gravity through the drain cylinders and tubes 128 unless the tubes 128 are closed by a pinch valve. Liquids are controllably dispensed by pinching and un-pinching the flexible tubes 128 using a pinch valve described herein.

As described below, a pinch valve configured for use with the liquid dispenser 10 is comprised of a tube pinching device and an electrically powered solenoid or other linear actuator. The tube pinching device is preferably comprised of a pinch bar described in the applicant's co-pending patent application serial number 13/169,509 entitled, "Pinch Bar," filed on Jun. 27, 2011, and which is also incorporated by reference herein in its entirety.

Figure 2:
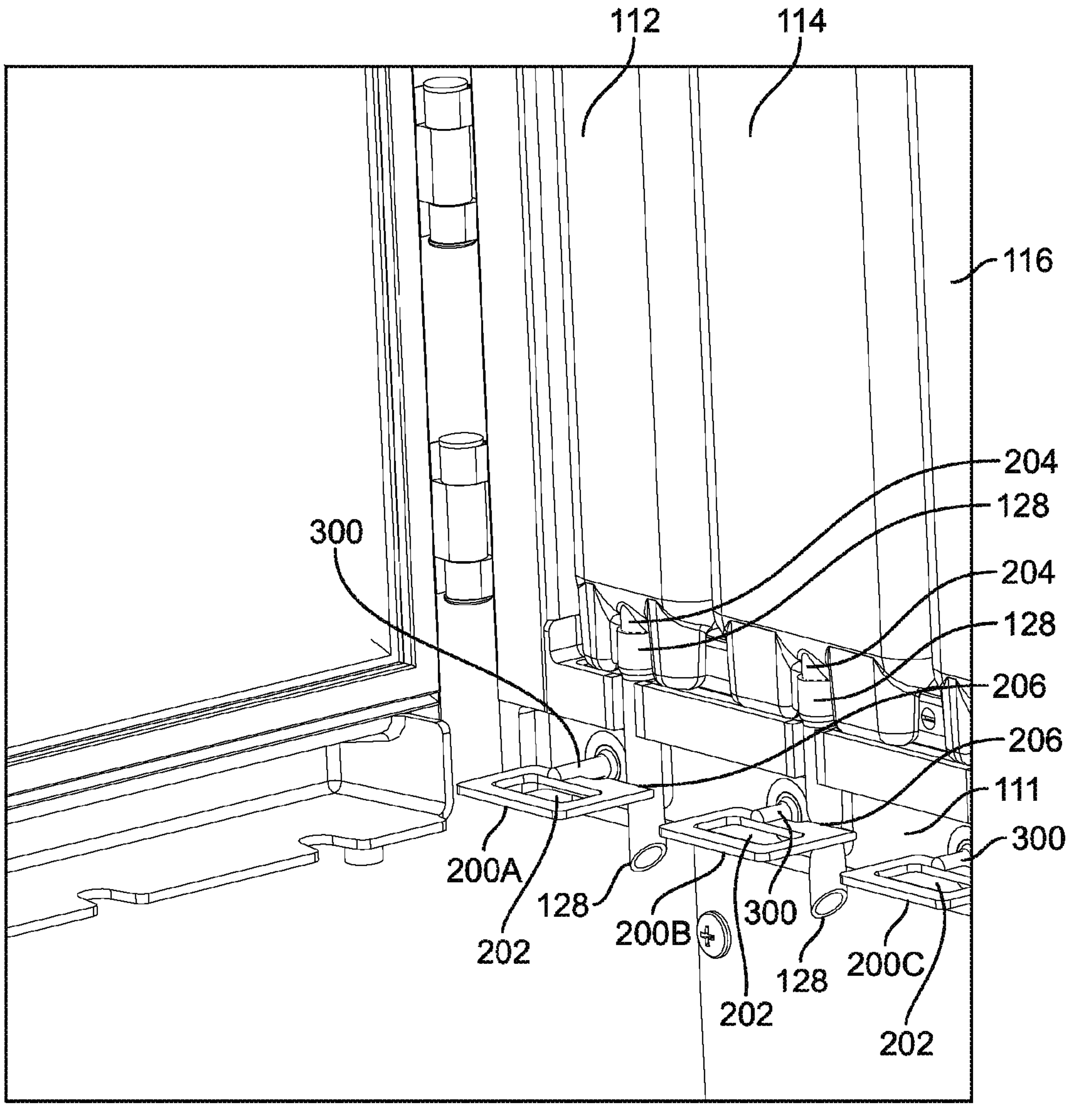
FIG. 2 is a close-up view of the front of the dispenser shown in FIG. 1.

FIG. 2 is an isolated view of a portion of the front of the liquid dispenser 10 depicted in FIG. 1. The drain cylinders 204 in the container bottoms are inserted into flexible tubes 128. The tubes 128 extend downwardly from the drain cylinders 204 and "under" a horizontally-oriented, user-operable pinch valve handle 200. Stated another way, the tubes 128 extend downwardly but between a horizontal pinch valve handle 200 and a valve body, not visible in FIG. 2 but detailed below.

Three handles 200A, 200B and 200C are shown in FIG. 2. The handle 200 is a substantially flat or planar, rectangle, having a central region 202 open to facilitate grasping the handle 200 by an operator.

Each handle 200A, 200B and 200C is attached to an elongated rod 300, which extends into a lower panel 111 that extends across the front of the dispenser. A spring device, not visible in the figures because it is inside the Pinch Bar, biases the elongated rod 300 and the handle 200 attached to the rod 300, inwardly vis-à-vis the cabinet 100. Stated another way, the bias force from a spring inside the Pinch Bar urges the rod 300 and handle 200 in a direction that is away from a user of the dispenser 10 and toward the rear side 108 of the cabinet 100.

As described in the aforementioned co-pending patent application, each handle 200 is formed to also provide a relatively narrow pinching edge 206. The spring bias force is thus directed through a relatively narrow area defined by the pinch edge 206, which faces a fixed valve body, not readily visible in FIG. 1 or FIG. 2. The pinching edge can thus be considered as focusing the force provided by the aforementioned spring, through the handle 200 to the pinching edge 206 of the handle 200. When a flexible tube 128 is placed between the pinching edge 206 and a fixed surface, the closing force on the rod 300 will tend to pinch the tube 128 closed. The bias or valve closing force on the rod 300, which is provided by the aforementioned spring device, is thus considered herein to be a valve closing force. Stated another way, the aforementioned spring device provides a valve closing force.

The pinching edge or surface 206 is preferably a narrowing of a side or edge of the handle 200 that faces a valve body surface. Such an edge can have different cross sections or profiles, such as those shown in FIG. 7 of the applicant's co-pending "Pinch Bar" application.

An important aspect of the aforementioned "Pinch Bar" is that the valve closing force can be overcome electrically or manually. The open central region 202 is thus large enough to allow at least one human finger to be inserted into the central region 202 to facilitate pulling the handle 200 and the pinching edge 206 away from a valve body against which the pinch surface 206 applies a pinching, closing force to a flexible tube 128.

Figure 3:
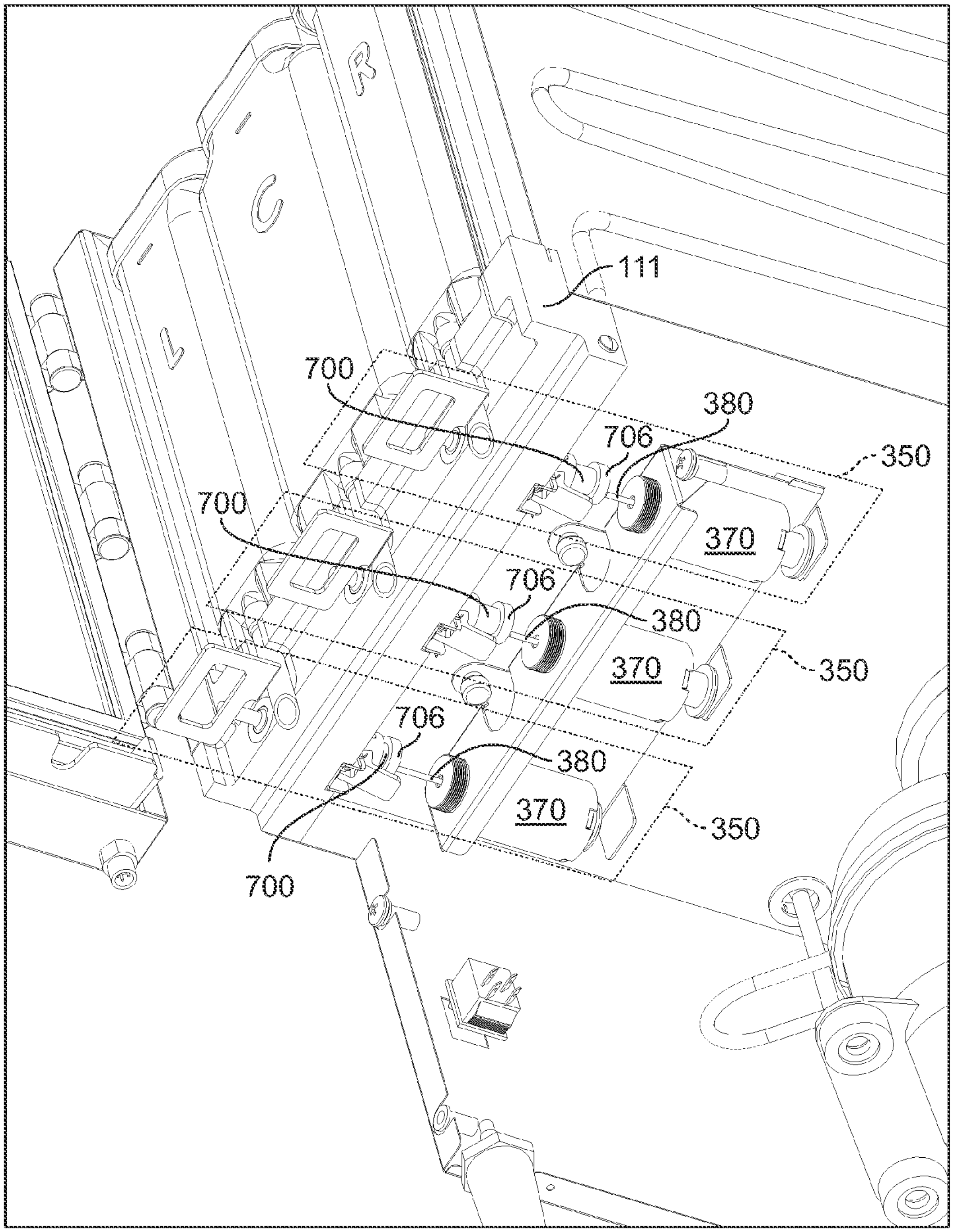
FIG. 3 is a perspective view of the underside of the dispenser shown in FIG. 1, viewed from its front and showing three separate pinch valve assemblies.

In an alternate embodiment, the elongated rod 300 can be bent or "L-shaped" as shown in FIGS. 2 and 3 of the co-pending patent application Ser. No. 12/885,641, filed Sep. 20, 2010, entitled "Pinch Valve." The content of application Ser. No. 12/885,641 is incorporated herein by reference in its entirety.

As used herein, the terms "spring" and "spring device" refer to any device that returns to an original shape after being compressed or stretched. Because of their ability to return to their original shape, springs are used to store energy. A spring can be formed as a coil or a strip. A twisted or twistable rod or bar can also act as a spring and sometimes referred to as torsion bar. A torsion bar is a flexible spring that can be moved about its axis via twisting. It works by resisting the torque placed on it. When one end of the bar is affixed to an object that cannot be moved, the other end of the bar is twisted, thus causing torque to build up. When this happens, the torsion bar is resistant to the torque and will quickly go back to its starting position once the torque is removed.

FIG. 3 is a perspective view of the underside of the liquid dispenser 10, i.e., looking upwardly at the bottom of the refrigerated portion of the cabinet 100, but from a point located in front of the cabinet 100. Three pinch valves 350 are shown. Each pinch valve 350 is comprised of the aforementioned "Pinch Bar" 360 described in the co-pending patent application but not visible in the figure and, an electrically actuated solenoid or linear actuator device 370.

A spring device in the pinch bar portion of the pinch valve 350 exerts a valve closing force on the pinching surface 206 through the elongated rod 300, also not visible, both of which comprise the aforementioned "Pinch Bar." In order for the pinch valve 350 to be opened electrically, and thereby dispense liquids electrically, a solenoid/linear actuator 370 is utilized. The solenoid/linear actuator 370 is a device configured to provide a force directed against the base portion 706 of the spring stop 700 of the pinch bar 360. The force applied by the solenoid 370 is thus in a direction that is opposite the direction of the valve closing force, i.e., forwardly and away from the rear 108 of the cabinet and toward the front 106 where a person would operate the liquid dispenser 10. The valve opening force provided by the linear actuator 370 is applied to the base portion 706 through a push rod 380 that is mechanically coupled to the armature of the linear actuator 370 but not connected or mechanically attached to the Pinch Bar. The push rod 380 is not attached or connected to the Pinch Bar so that enables the Pinch Bar to be physically removed from the horizontal lower panel 111.

Figure 4:
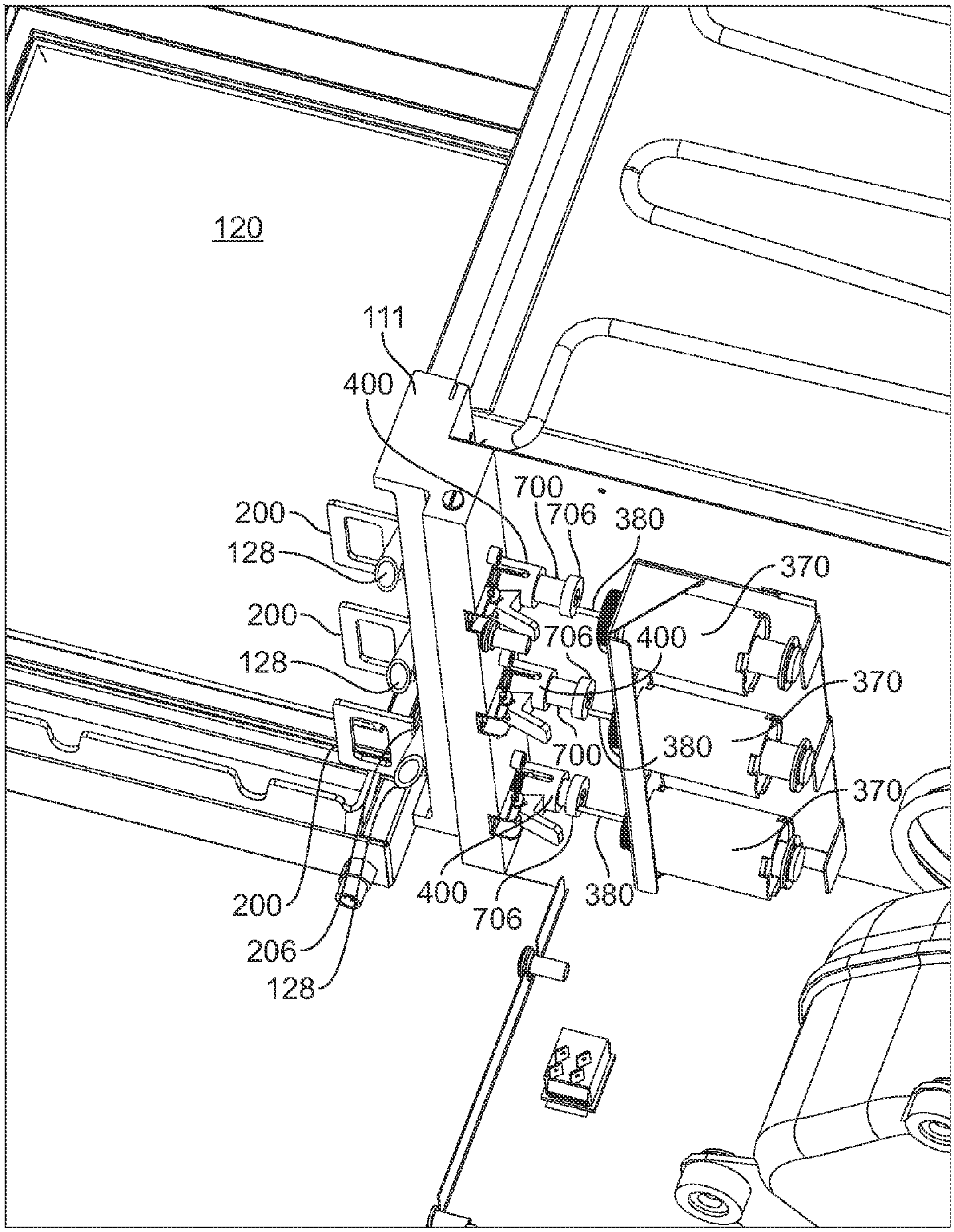
FIG. 4 is a perspective view of the underside of the dispenser shown in FIG. 1, viewed from its rear and showing the three separate pinch valve assemblies and the pinch bars used with each.

FIG. 4 is another view of the bottom of the liquid dispenser 10 but viewing the underside from a point that is behind the front of the cabinet 100. The rod actuator 400 described in the aforementioned co-pending "Pinch Bar" extends through the lower panel 111. The push rods 380 can be seen impinging the base portion 706.

Figure 5:
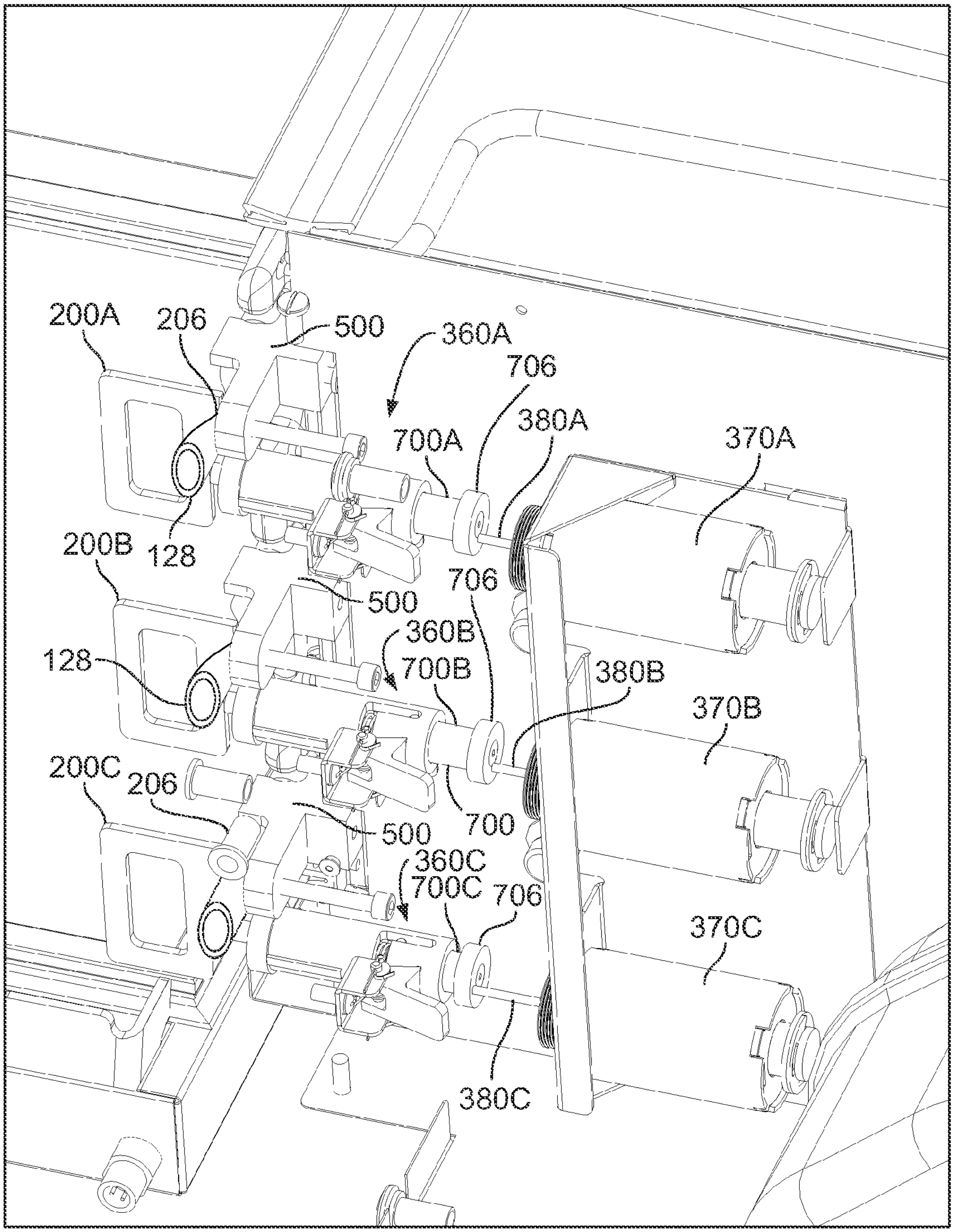
FIG. 5 is another view of the bottom of the liquid dispenser 10, but with a horizontal lower panel removed.

FIG. 5 is a close-up view of the pinch valves shown in FIG. 4. The horizontal lower panel 111 is also removed in FIG. 5 to show how each pinch bar 360 and its corresponding solenoid 370 effectuates a pinch valve that is operable electrically and manually. Two push rods 380A and 380B are drawn as being shorter than the third push rod 380C. Similarly, the third spring stop portion 700C of the third Pinch Bar 360C is depicted as being shorter than the first spring stop portion 700A of the first Pinch Bar 360A and the second spring stop portion 700B of the second Pinch Bar 360B. And, the third handle 200C is depicted as being further away from the front of the cabinet 100 and a valve body 500. In this case, the flexible tube 128 is not pinched at all. The first handle 200A is depicted as being closest to the front of the cabinet 100 and a valve body 500 against which the flexible 128 is pinched closed by the valve closing force provided by a spring device inside the pinch bar 360A. The second handle 200B is depicted similarly as the first handle 200A. The longer third push rod 380C depicts actuation of the third solenoid 370C and its application of a valve opening force through the push rod 380C and into the base portion 706 of the pinch bar 360C.

As described in the applicant's co-pending patent application Ser. No. 12/885,641 entitled "Pinch Valve" and which was filed Sep. 20, 2010, and which is incorporated by reference, each solenoid can be computer controlled and is able to drive a corresponding push rod 380A, 380B and 380C forwardly, i.e., in a direction that is away from the back side 108 of the cabinet 100 and into the bottom end or base portion 706 of a pinch bar 360 responsive to an electric signal applied to the solenoid. The valve opening force provided by the solenoids thus acts in a direction that opposes the valve closing force because it acts in a direction that is away from the rear side 108 of the cabinet 100 and toward where a person using the liquid dispenser would be standing and operating the pinch valves to dispense liquids.

Figure 6:
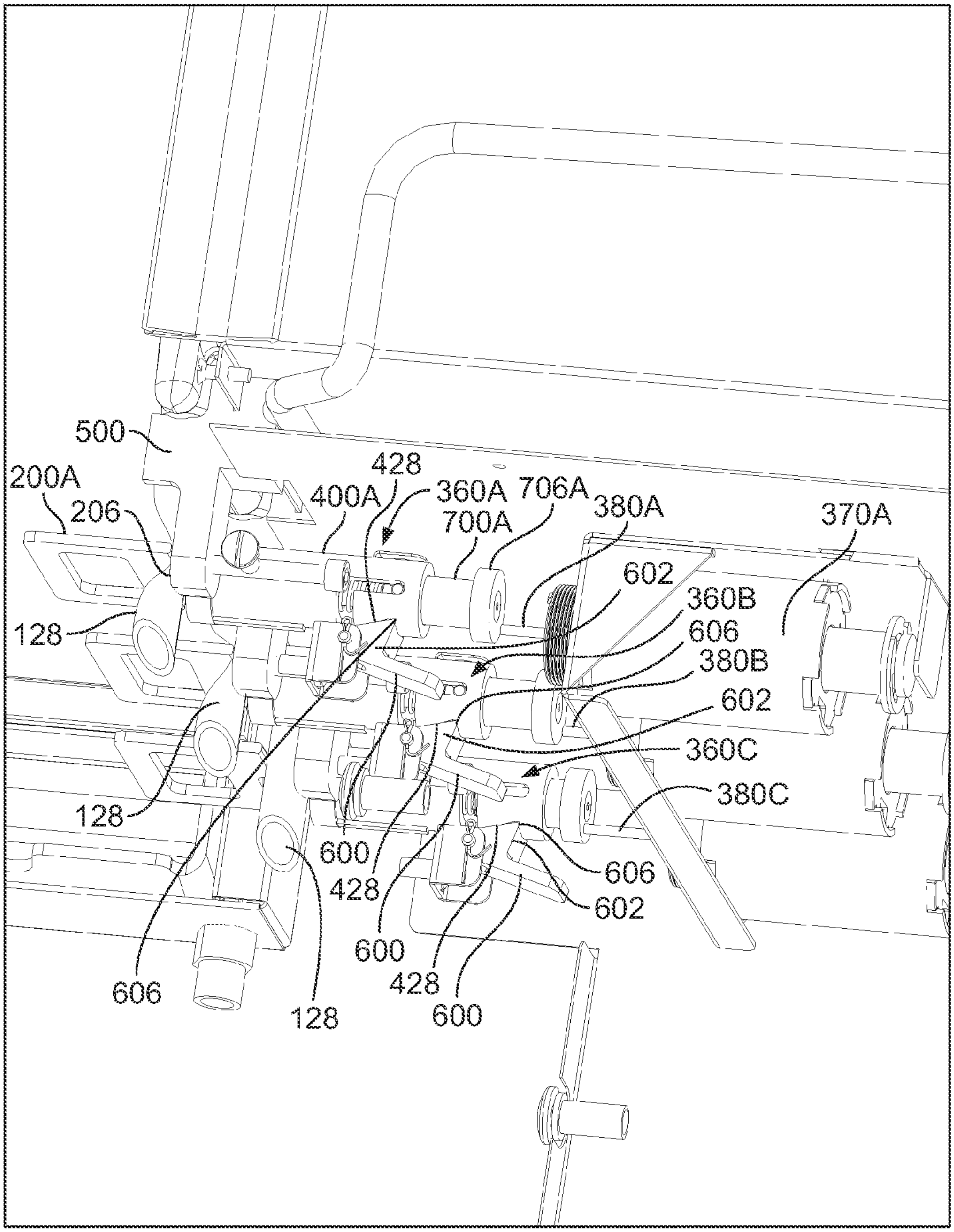
FIG. 6 is a side view of the structure shown in FIG. 5.

FIG. 6 is a side perspective view of the structure shown in FIG. 5. The pinch valves 360A-360C are held in place in the valve body 500 by a somewhat L-shaped spring-loaded clip 600. The short leg 602 of the L-shaped retaining clip 600 has an edge 606 that engages a notch 428 formed into the outside surface of the rod actuator 400 and provides a detent that holds the Pinch Bar 360 in the valve body 500. Pushing the long leg of the retaining clip 600 disengages the edge 606 from the notch 428, which permits the pinch valves to be pulled out of the valve body 500 and the lower panel 111.

Figure 7:
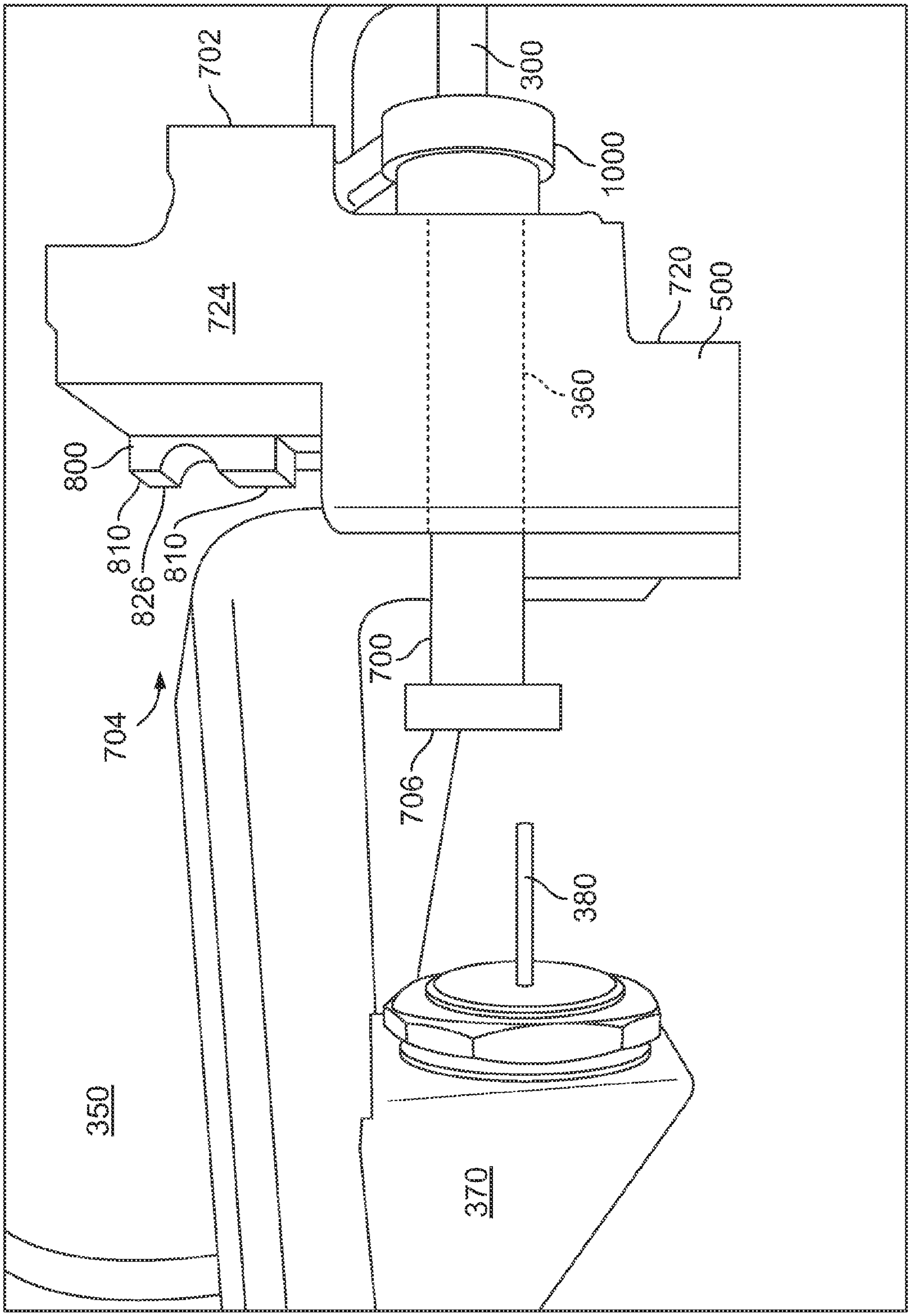
FIG. 7 is a side view of one pinch valve.

FIG. 7 is a side view of one pinch valve 350 for use with the cabinet 100 depicted in FIG. 1. The pinch valve 350 is comprised of a valve body 500 having a front face or side 702 and an opposing rear face or side 704. The pinch bar 360 described above extends through a lower portion 720 of the valve body 500. A heat sink 800 is fixed in a top portion 724 of the valve body 500.

Figure 8A:
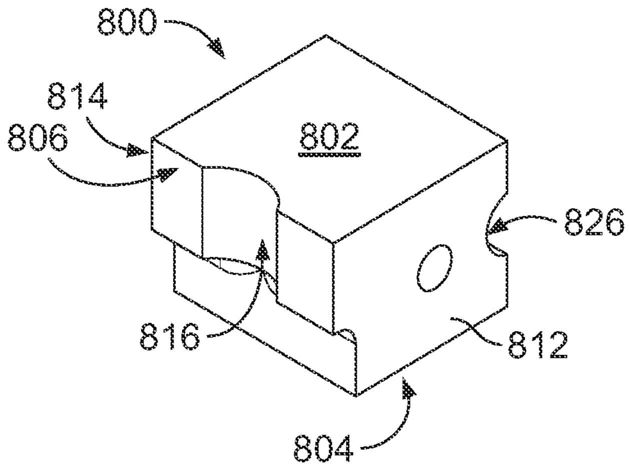
FIGS. 8A, 8B and 8C are views of a heat sink.

FIG. 8A is a perspective view of the heat sink 800, which is made of a thermally-conductive material such as aluminum, copper or brass. The heat sink 800 has a top surface 802, a bottom surface 804, a front face 806, which when installed into the valve body receives and abuts a flexible tube 128. The heat sink 800 also has a rear face 810 opposite the front face 806, a right side 812 and a left side 814.

Figure 8B:
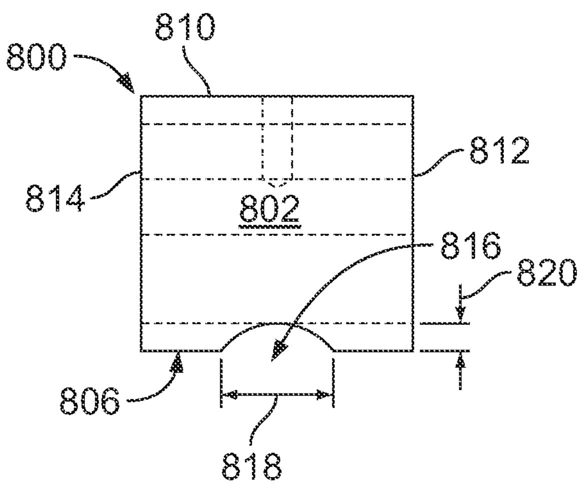

FIG. 8B is a top view of the heat sink 800. The right side 812 and left side 814 can be seen in FIG. 8B as substantially planar. The front face 806, however, has a channel 816 sized to receive a tube 128 that dispenses liquid from a container 112, 114 or 116. In one embodiment the channel 816 has a cross sectional shape (when viewed from the top) that is an arc of a circle. In another embodiment the channel 816 is an arc of an ellipse.

The channel 816 in the front face 806 of the heat sink 800 is considered herein to be a concavity, inasmuch as the channel 816 is concave vis-à-vis the front face 806. The channel 816 has a width 818 as shown, and a depth 820 sufficient to receive a flexible tube 128 that extends from a container 112, 114 and 116 and restricts the tube's side-to-side translation as the tube is pinched and un-pinched.

Figure 8C:
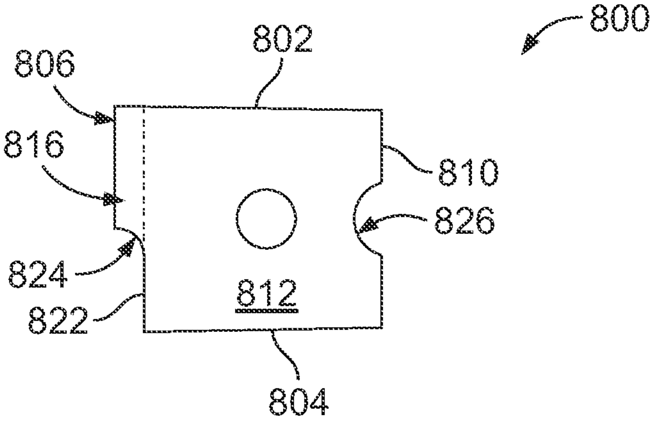

FIG. 8C is a right-side view of the heat sink 800. The top face 802 and the bottom face 804 can be seen to be substantially planar. The front face 806 can be seen in FIG. 8C as having a second, recessed lower front face 822, that is itself substantially vertical, substantially planar and setback into the body of the heat sink 800 from the upper front face 806 by a distance substantially equal to the depth 820 of the channel 818. A chamfer 824 provides a transition from the upper or extended face 806 backwardly, i.e., toward the rear side 810, to the recessed lower front face 822. The recessed lower front face 822 is the surface against which a pinching force is exerted by a pinch bar or a pinching edge 206.

The back face 810 of the heat sink 800 has a second, horizontally-oriented channel 826, which is also considered herein to be a concavity. The cross sectional shape of the second channel 826 (when viewed from either side) is an arc of a circle. The second channel 826 has a depth and a width configured to mate with the outside surface of a length of tubing (not shown but well known in the art) which carries a heat transfer fluid, such as a compressed and cooled gas used in a refrigeration system evaporator coil. In another embodiment, a tube fit into the second channel 826 carries a hot liquid. The mechanical attachment of a refrigeration coil or a heating coil into the second channel 826 provides a direct thermal and mechanical coupling of the heat sink 800 to a heat-absorption fluid or a heat source fluid.

In another embodiment, the back face 810 is smooth and has attached to it, the cold side of a Peltier device, not shown but well known in the art. In another embodiment, the channel 826 formed in the back face 810 has an electric heating element attached to it, which provides heat energy into the heat sink 800. In yet another embodiment, a smooth back face 810 has the hot side of a Peltier device attached to it, which also provides heat energy into the heat sink 800. Regardless of whether the heat sink 800 back face 810 is attached to a source of heat energy or a heat sink, the direct, mechanical coupling of the heat sink 800 to a heat transfer device, such as an evaporator coil, a Peltier device, or a heating element, significantly improves heat transfer to and from liquids in a flexible tube 128 that abuts the front face 806/822.

Figure 9:
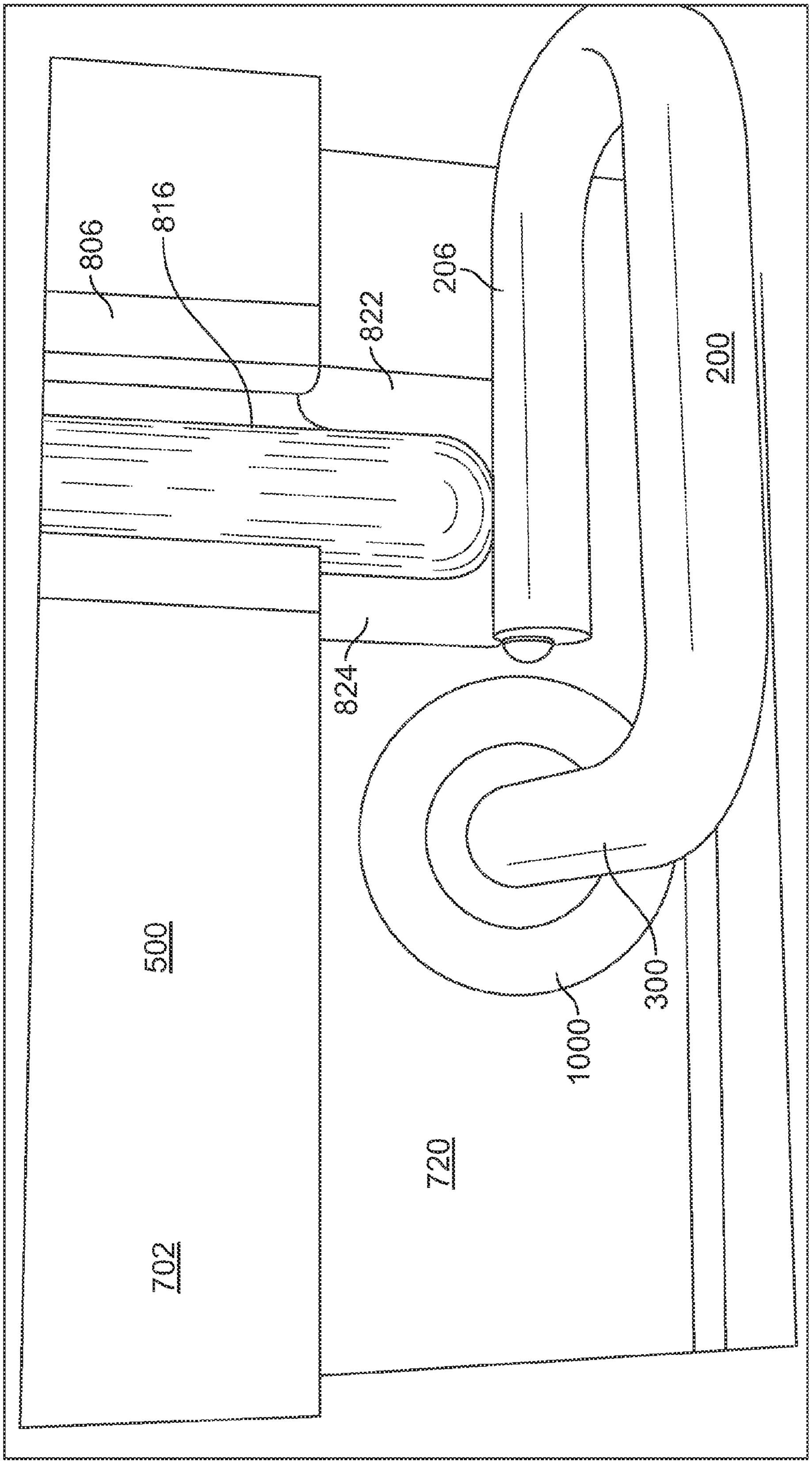
FIG. 9 is a view of the front side of the valve body.

FIG. 9 is a view of the front side of the valve body 500. A substantially L-shaped rod 300 passes through a removable shaft seal 1000 in the valve body 500. The seal 1000 prevents liquids from migrating into the valve body 500 along the rod 300.

As described in the co-pending Pinch Valve application, the pinch bar shown in FIG. 9 has an axis around which the pinch bar can rotate in order to facilitate the removal and/or installation of a tube from and into the pinch valve.

In FIG. 9, a J-shaped handle is sized, shaped and arranged such that a user can pull the pinch bar away from the valve body 500.

The foregoing description is for purposes of illustration only. The true scope of the invention is set forth in the appurtenant claims.

What is claimed is:

1. A pinch valve comprising:

a tube pinching device comprising a handle, the handle including a pinching edge, the handle being attached to a rotatable and linearly translatable rod portion having a first end attached to the handle, the rod portion, its first end and the handle being configured to translate linearly between a first valve open position and a second valve closed position responsive to force provided to the rod portion from at least one of: an electrically powered linear actuator, a valve closing spring and a user pulling on the tube handle of the pinching device, the handle including a pinching edge;

and an electrically powered linear actuator configured to provide a mechanical valve opening force to the tube pinching device, the valve opening force being generated to act in a first direction which causes the tube pinching device to translate from the closed position to the open position.

2. The pinch valve of claim 1, wherein the linear actuator is additionally configured to selectively provide a valve closing force to the tube pinching device, the valve closing force acting in a second direction opposite the first direction and causing the tube pinching device to translate from the valve open position to the valve closed position.

3. The pinch valve of claim 1, wherein the tube pinching device is coupled to a spring device configured to apply a valve closing force to the tube pinching device, the valve closing force acting in a second direction opposite the first direction and having a magnitude less than the magnitude of the mechanical valve opening force.

4. The pinch valve of claim 1, wherein the handle has an opening that is sized, shaped and arranged to receive at least one finger and wherein the tube pinching device is additionally configured to be capable of being linearly translated manually between an open position and a closed position by actuation of the operator handle and capable of being rotated manually when in said open position.

5. The pinch valve of claim 4, wherein the operator handle is comprised of an edge, through which the valve closing force is applied toward a fixed surface.

6. The pinch valve of claim 1, further comprised of a valve body, and wherein the rod portion extends at least part way through the valve body, the rod portion being rotatable in the valve body.

7. A pinch valve comprising:

a handle having an open center bounded by an exterior edge, the open center region being sized and shaped to be able to receive a finger, a first portion of the exterior edge of the handle being configured to apply a tube pinching force against a surface;

an elongated and rotatable rod having first and second ends, the first end of the rod being attached to the handle;

a refrigerated heat sink formed from a block of metal, the heat sink comprising a first side that faces away from the block of metal, a first portion of the first side being formed to have a first channel that is substantially vertical, the first channel having a width and a depth, the width and depth selected to receive a length of a flexible tube that extends downwardly from a container of liquid that is to be dispensed and restrict side-to-side translation of a tube in the first channel, the first side of the heat sink having a second portion to which the tube pinching force is applied, the heat sink additionally comprising a second side having a second channel, which is sized, shaped and arranged to receive a length of tubing, configured to carry a refrigerated heat transfer fluid;

a tube pinching spring coupled to the elongated rotatable rod and, configured to urge the elongated rod and first portion of the handle toward the first side of the heat sink; and an electrically powered linear actuator coupled to the elongated rod and configured to move the elongated rod and first portion of the handle away from the first side of the heat sink.

8. The pinch valve of claim 7, wherein the second portion of the first side is set back from the first portion by a distance substantially equal to the depth of the first channel.

9. The pinch valve of claim 7, wherein the second channel is substantially horizontal.

10. The pinch valve of claim 7, wherein the first channel is concave and has a bottom, which is substantially co-planar with the second portion of the first side, and wherein the second side of the heat sink comprises a second concave channel, configured to receive the length of tubing carrying that is configured to carry a refrigerated heat transfer fluid and provide thereby, a direct thermal and mechanical coupling of a heat-absorption fluid to the heat sink.

11. The pinch valve of claim 7, wherein the rod and the handle are configured to be translated away from the second portion of the first side of the heat sink by manually pulling the handle away from the heat sink.

12. The pinch valve of claim 11, wherein the handle and rod are additionally configured to be manually pulled and manually rotated.

13. The pinch valve of claim 12, wherein the first portion of the handle is a narrowed edge.

14. A liquid dispenser comprising:

a refrigerated cabinet having an interior, which is sized and shaped to receive at least two containers of liquid to be dispensed, each of the containers being provided with elongated flexible tubes through which liquid from inside the container can flow, the cabinet being additionally comprised of a pinch valve for each container, each pinch valve comprising:

a refrigerated heat sink against which a tube pinching force is applied to a flexible tube by a tube pinching device, the refrigerated heat sink comprising a first substantially vertical channel formed in a first side of the heat sink, the first channel being sized, shaped and arranged to receive a length of the flexible tube from a container, that is extended from inside the cabinet, the refrigerated heat sink additionally comprising a second substantially horizontal channel formed into a second side of the refrigerated heat sink, the second channel being sized, shaped and arranged to receive a length of tubing carrying a heat-absorbing fluid, the refrigerated heat sink being capable of conducting heat between a liquid in a flexible tube in the first channel and a length of tubing carrying heat-absorbing fluid;

an elongated pinch bar extending at least part way through the valve body, the pinch bar having a first end to which a valve opening force is applied by a linear actuator;

a spring device coupled to the elongated pinch bar and providing a valve closing force thereto; and an electrically powered linear actuator configured to provide a valve opening force to the first end of the elongated pinch bar, the valve opening force acting in a second direction that is away from a rear side of a cabinet to which the pinch valve is attached.

15. The liquid dispenser of claim 14, wherein the first side of the refrigerated heat sink has first and second portions, wherein the first channel is a concavity having a length, width and depth and is formed into the first portion of the first side, wherein the second portion of the first side is set back from the first portion by a distance substantially equal to the first channel depth.

16. The liquid dispenser of claim 14, wherein the second channel is a substantially horizontal concavity formed into the second side.

17. The liquid dispenser of claim 14, further comprising a spring device configured to apply a valve closing force to the tube pinching device, the valve closing force acting in a second direction opposite the first direction and having a magnitude less than the magnitude of the valve opening force.

* * * * *